(12) United States Patent
King et al.

(10) Patent No.: US 6,499,659 B1
(45) Date of Patent: Dec. 31, 2002

(54) PULSE SHAPING FOR A TRANSFORMER COUPLED READ/WRITE RECORDING DEVICE

(75) Inventors: Francis K. King, San Jose, CA (US); Ranvir Koshal, Sunnyvale, CA (US)

(73) Assignee: DCARD, Inc., Milpitas, CA (US)

( * ) Notice: Subject to any disclaimer, the term of this patent is extended or adjusted under 35 U.S.C. 154(b) by 0 days.

(21) Appl. No.: 09/433,781

(22) Filed: Nov. 3, 1999

Related U.S. Application Data

(60) Provisional application No. 60/081,257, filed on Apr. 9, 1998.

(51) Int. Cl.[7] ................................................. G06K 7/08
(52) U.S. Cl. ........................ 235/449; 235/492; 235/493
(58) Field of Search ................................ 235/449, 439, 235/453, 480, 493, 375

(56) References Cited

U.S. PATENT DOCUMENTS

| | | | | |
|---|---|---|---|---|
| 3,598,965 A | * | 8/1971 | Ano | 235/61.7 R |
| 5,107,099 A | * | 4/1992 | Smith | 235/449 |
| 5,446,716 A | * | 8/1995 | Eastman et al. | 369/54 |
| 5,838,558 A | * | 11/1998 | Tan et al. | 363/91 |
| 6,106,959 A | * | 1/2000 | Kamo et al. | 235/449 |
| 6,021,951 A | * | 2/2000 | Nishikawa | 235/494 |
| 6,050,488 A | * | 4/2000 | Clayton et al. | 235/450 |
| 6,131,816 A | * | 10/2000 | Smith, Sr. | 235/475 |
| 6,173,899 B1 | * | 1/2001 | Rozin | 235/492 |

FOREIGN PATENT DOCUMENTS

| | | | | |
|---|---|---|---|---|
| JP | 04320594 | * | 11/1992 | G06K/17/00 |

* cited by examiner

Primary Examiner—Thien M. Le
Assistant Examiner—Ahshik Kim
(74) Attorney, Agent, or Firm—Bo-In Lin

(57) ABSTRACT

This invention discloses a data storage drive system. The system includes a pickup head for performing data access functions connected to a secondary winding of a transformer. The transformer further includes a primary winding connected to a driver controller provided with a pre-amplifier for generating a data writing pulse. The secondary winding further having an pulse decay-constant adjustment capacitor and a pulse decay-constant adjustment inductor for adjusting a pulse decay constant for generating less than ten-percent sag for the data writing pulse whereby the writing pulse can overwrite an entire bit-length onto a data track In a preferred embodiment, the pickup head and the secondary winding are configured as a removable and replaceable module. In a preferred embodiment, the pickup head is provided with signal reading and writing head for a magnetic or optical flat data-storage medium. In another preferred embodiment, the pickup head is provided with signal reading and writing head for an optical flat data-storage medium. In another preferred embodiment, the drive system is further provided with an optical to electrical signal converter for converting optical signals retrieved from the optical flat data-storage medium to electrical signals.

20 Claims, 12 Drawing Sheets

PULSE SHAPING FOR A TRANSFORMER COUPLED READ/WRITE RECORDING DEVICE

This Application is a Continuation-in-Part (CIP) Formal Application claims a Priority Date of Apr. 9, 1998, benefited from a previously filed Provisional Application No. 60/081,257 by the same Applicants of this Application.

BACKGROUND OF THE INVENTION

1. Field of the Invention

This invention relates generally to systems and method for reading data from and writing data to data storage medium by employing the data recording technology. More particularly, this invention is related to an improved data access system. The data access system is implemented in a portable data-card drive device that has a high-speed data access subsystem with novel pulse shaping circuit for performing transformer-coupled read/write operations. The transformer-coupled pickup head becomes a removal and conveniently replaceable unit to enhance a long-term reliable and economical operation of the data card drive system.

2. Description of the Prior Art

Conventional technology of reading-writing data on concentric circular data tracks of a flat data storage medium often presents a problem that the data-bit density varies between the outer tracks and the inner tracks. The variable bit density in data storage is due to a geometrical factor that the outer data tracks are much longer in length than the inner tracks. A common practice is to form the inner tracks with a capacity to store the data bit at a higher bit density than that of the outer tracks. Due to the variations of data storage density between the inner and outer data tracks, a more complicated servo control system implemented with more complex signal-processing algorithms is required. Additionally, by varying the data storage density from the inner tracks toward the outside tracks, the data transfer rate is also changed in accessing data from the inner tracks compared to the outside data tracks. More complicated data processing schemes must be applied to deal with such access rate variations. Higher error rates may incur due to these variations between the inner tracks and the outer tracks.

Additionally, a conventional disk drive system implements a directly coupled configuration with the pickup head directly connected to a preamplifier. The directly coupled pickup configuration often imposes a limit on the life span and usefulness of the storage medium as the pickup head is more prone to damages. When a pickup head is damaged, the disk drive system crashes and the whole system becomes useless. Unless properly backed up, the data stored in storage medium with a damaged pickup head would be very difficult to retrieve. For a direct coupled pickup head, this inherent limitation cannot be overcome with the technology currently available in the data recording and storage industry.

Therefore, a need still exists for an improved data-card drive system to overcome the aforementioned difficulties encountered in the prior art. Specifically, this storage card drive system must provide a uniform density for data storage and a data-card drive system to access the data-storage card. Furthermore, it would be desirable that this system is portable and is also provided with several standardized sizes for processing standardized data-storage cards.

SUMMARY OF THE PRESENT INVENTION

Therefore, an object of the present invention is to provide a data storage-card drive system with a pickup head moving above the data-storage card in rotational movement. The data read-write functions are enabled only for arc-segments of the rotational movement such that the data tracks are arranged as plurality of parallel arcs, e.g., half-circles. The pickup head is further configured with a transformer-coupled removable head that can be conveniently replaced such that the aforementioned difficulties and limitations encountered in the prior art can be resolved.

Specifically, it is an object of the present invention to provide an improved transformer coupled pickup head configured as a removal module that can be conveniently removed and replaced. The pickup head is connected to a secondary winding of the transformer with the primary winding connected to a driver for generating write current pulses. The secondary side of the transformer has a greater pulse decay constant to assure that the write current has a sufficient pulse width to overwrite the entire length of the data bits on a data track Another object of the present invention is to provide an improved transformer coupled pickup head configured as a removal module that can be conveniently removed and replaced. The pickup head is formed as either a magnetic or optical pickup head. For an optical pickup head, the drive system is further provided with an optical to electrical converter to convert optical signals to corresponding electrical signals for transfer through the transformer to a data signal processor.

Another object of the present invention is to provide a data-storage card drive system with a pickup head driven by a motor, e.g., a brushless motor, to rotate over the data-storage card with the rotation axis perpendicular to the card surface. The motor is mounted on a carriage for making horizontal movement along a longitudinal direction of the data card. The position of the pickup head is then servo-controlled by moving the carriage and the motor while the data storage card either stays at a fixed position or the pickup head is rotated and the card makes horizontal linear movements.

Briefly, in a preferred embodiment, the present invention discloses a data storage drive system. The system includes a pickup head for performing data access functions connected to a secondary winding of a transformer. The transformer further includes a primary winding connected to a driver controller provided with a pre-amplifier for generating a data writing pulse. The secondary winding further having a pulse decay-constant adjustment capacitor and a pulse decay-constant adjustment inductor for adjusting a pulse decay constant for generating less than ten-percent sag for the data writing pulse whereby the writing pulse can overwrite an entire bit-length onto a data track In a preferred embodiment, the pickup head and the secondary winding are configured as a removable and replaceable module. In a preferred embodiment, the pickup head is provided with signal reading and writing head for a magnetic or optical flat data-storage medium. In another preferred embodiment, the pickup head is provided with signal reading and writing head for an optical flat data-storage medium. In another preferred embodiment, the drive system is further provided with an optical to electrical signal converter for converting optical signals retrieved from the optical flat data-storage medium to electrical signals.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
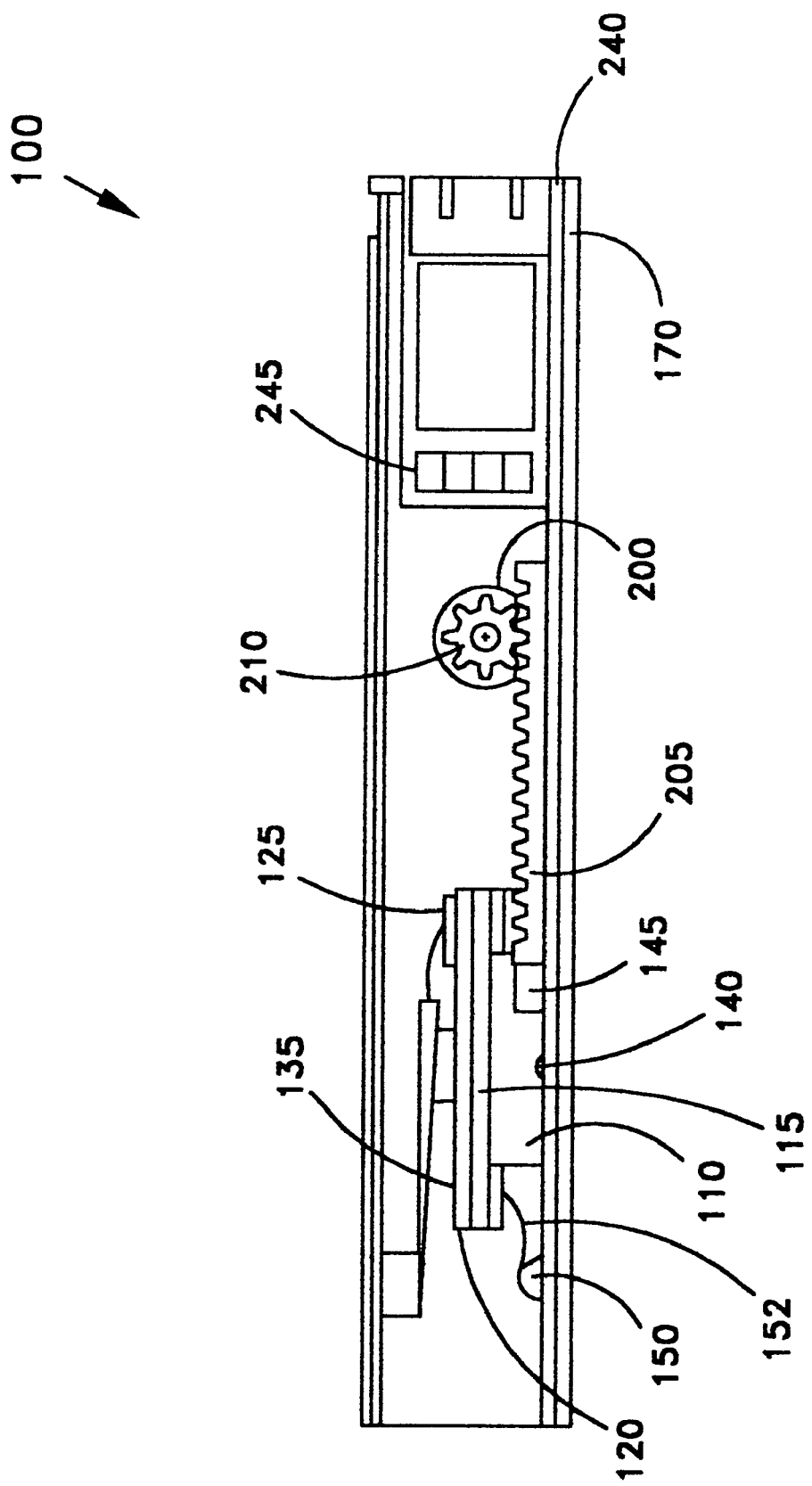
FIGS. 1A and 1B shows a cross sectional view and a top view respectively of a data card drive system of this invention.
Figure 1B:
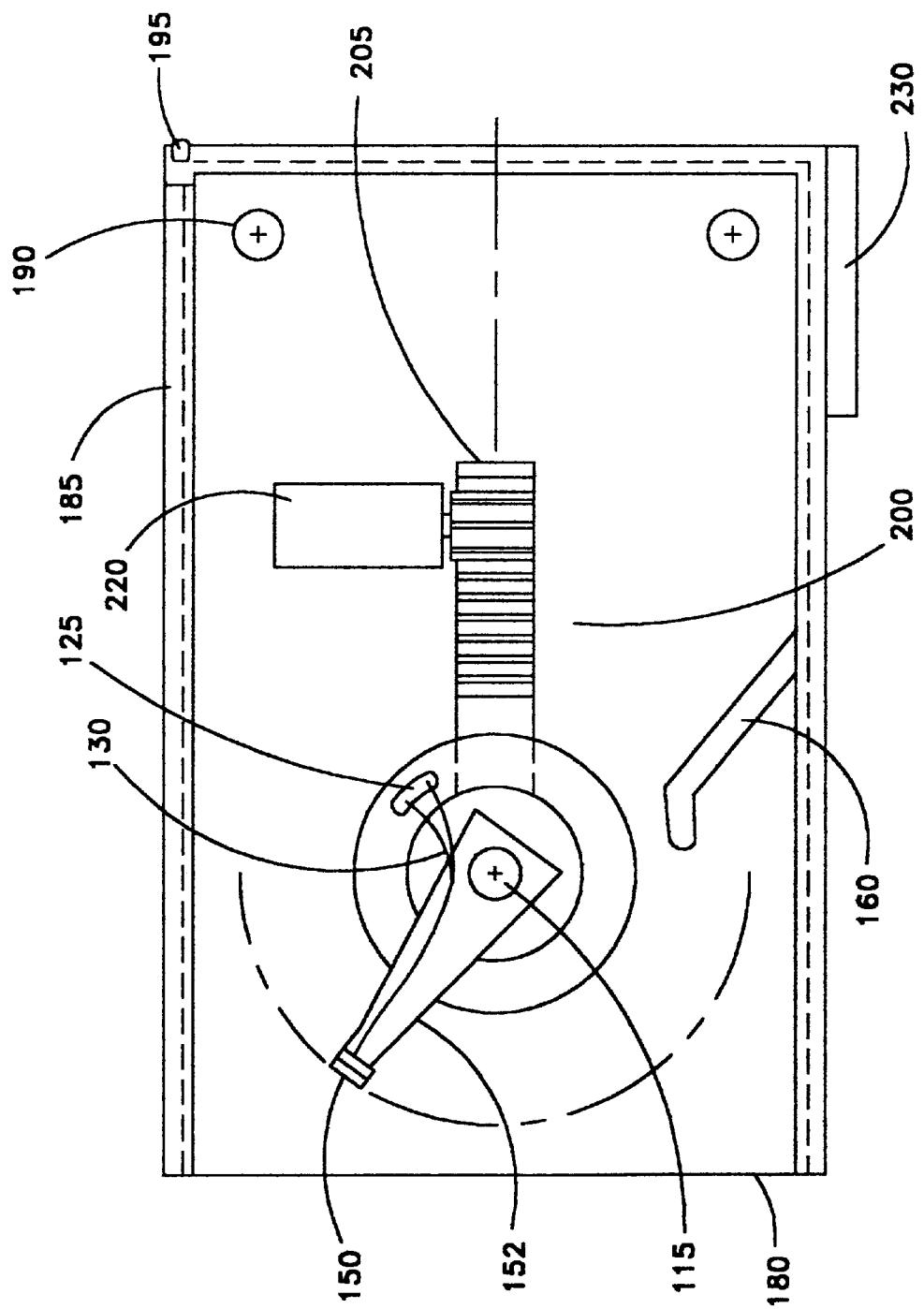

FIGS. 1A and 1B show a cross sectional view and a top view respectively of a data-card drive 100 of the present invention. The data-card drive 100 can be configured for reading and writing data-cards of different sizes, e.g., a PCMCIA type card or common credit card size. The data-card can also be of different shapes such as a square, a rectangular, a circular disk, or a card with straight and parabolic edges or different types of arc-edges. The data-card drive 100 includes a motor 110, e.g., a DC brushless motor. The motor 110 is provided to operate at a low speed to conserve battery power, at high speeds to achieve fast data access time. The motor 110 is further provided to function at two different modes, i.e., a sleep mode when not being deployed, and a wake up mode for normal data access operations. The motor 110 is mounted on a carriage 115 with a pickup head assembly mounted to the motor rotating shaft assembly. Half of a magnetic transformer, 120-1 which can either being a ring type, a round-disk type, or other geometrical shapes, is mounted onto the motor rotating shaft assembly, the other half of the magnetic transformer 120-2 of similar configuration is mounted to the fixed part of motor assembly. Signal wires 130 form head are soldered onto the rotating half of the transformer 120-1 with the soldering pad 125, that can also be a spring pressed connection, for transmitting the read/write signals via the magnetic transformer 120. The magnetic transformer 120-1 and the soldering pad 125 are covered by a magnetic flux shield plate 135 for shielding the magnetic flux generated by the magnetic transformer to prevent DC erase of data. A ground spring 140 is applied to perform the function of dissipating electric static discharges. Optionally, a brake-magnet 145 is provided to fix the "parking" position of the motor 110 in the sleep or power off mode during the time when there is no data access activities.

A read/write head 150 is mounted via an extended head-arm 152 to the brushless motor 110 via a head-arm mounting assembly mounting holes 155 to the head carriage 115. A head loading/unloading arm 160 is mounted on the base-plate 170. The loading/unloading arm 160 presses to the head-arm 152 at the unload position at a drive-device power-off mode. The loading/unloading arm 160 is removed from the head-arm 152 when a data card 180 is loaded and the power for the drive device is turned on. In order to assist a smooth loading of the data card 180 into the drive device 100, a card guide plate 185 is provided. The data-card drive system 100 further includes one or several data card pins 190 to engage and fix the position of the data card 180 when the data card 180 reaches a designated operational position. The data card pins 190 increases the compatibility and interchangeability of different types of data cards for data access operations using this data card drive system 100. The drive system 100 further includes an on/off switch 195, which is turned on when the data card 180 reaches its final position.

Figure 1C:
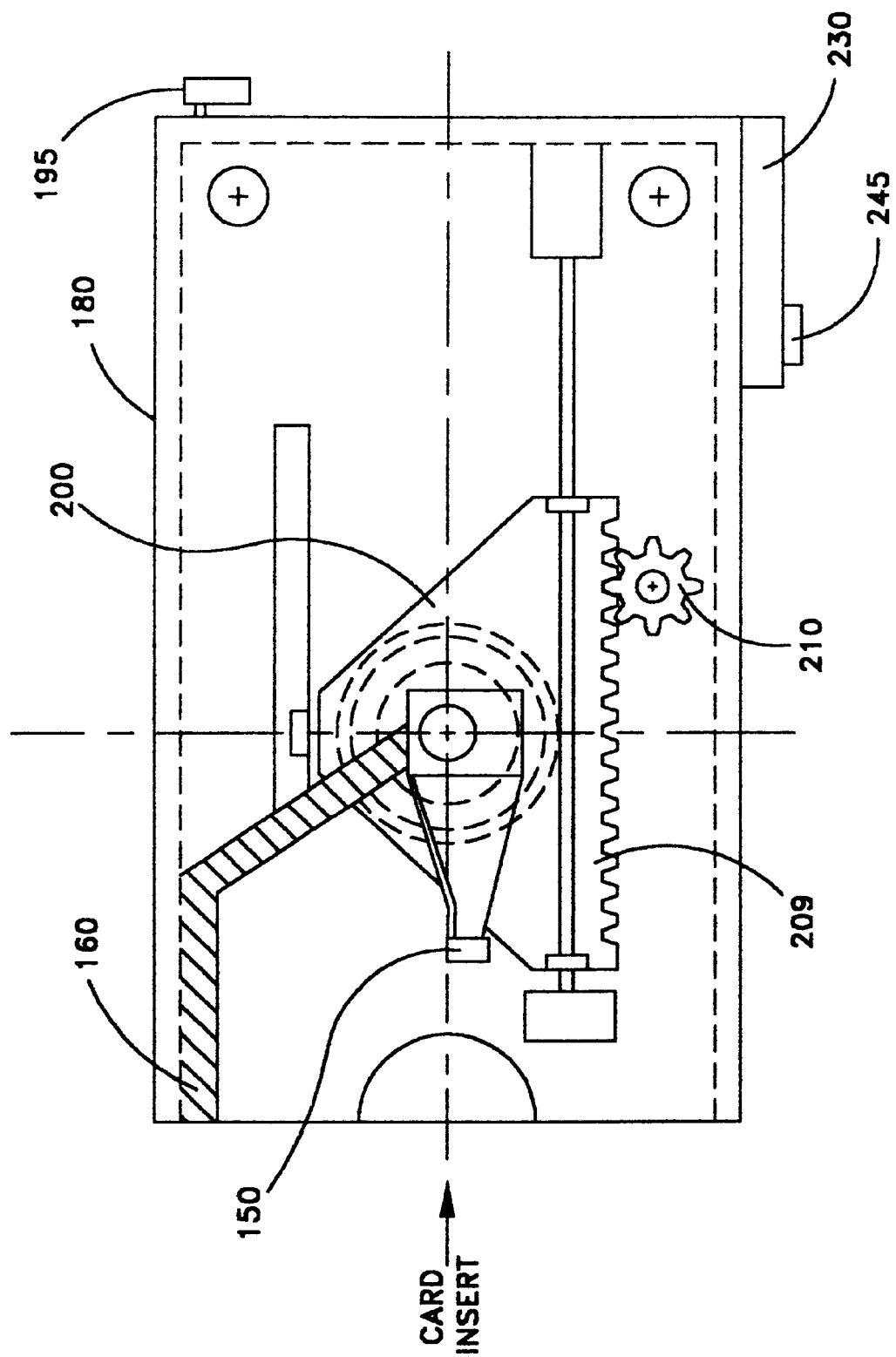
FIG. 1C is cross sectional view for showing the details of the motor rack mounting and the head loading/unloading assembly.
Figure 1D:
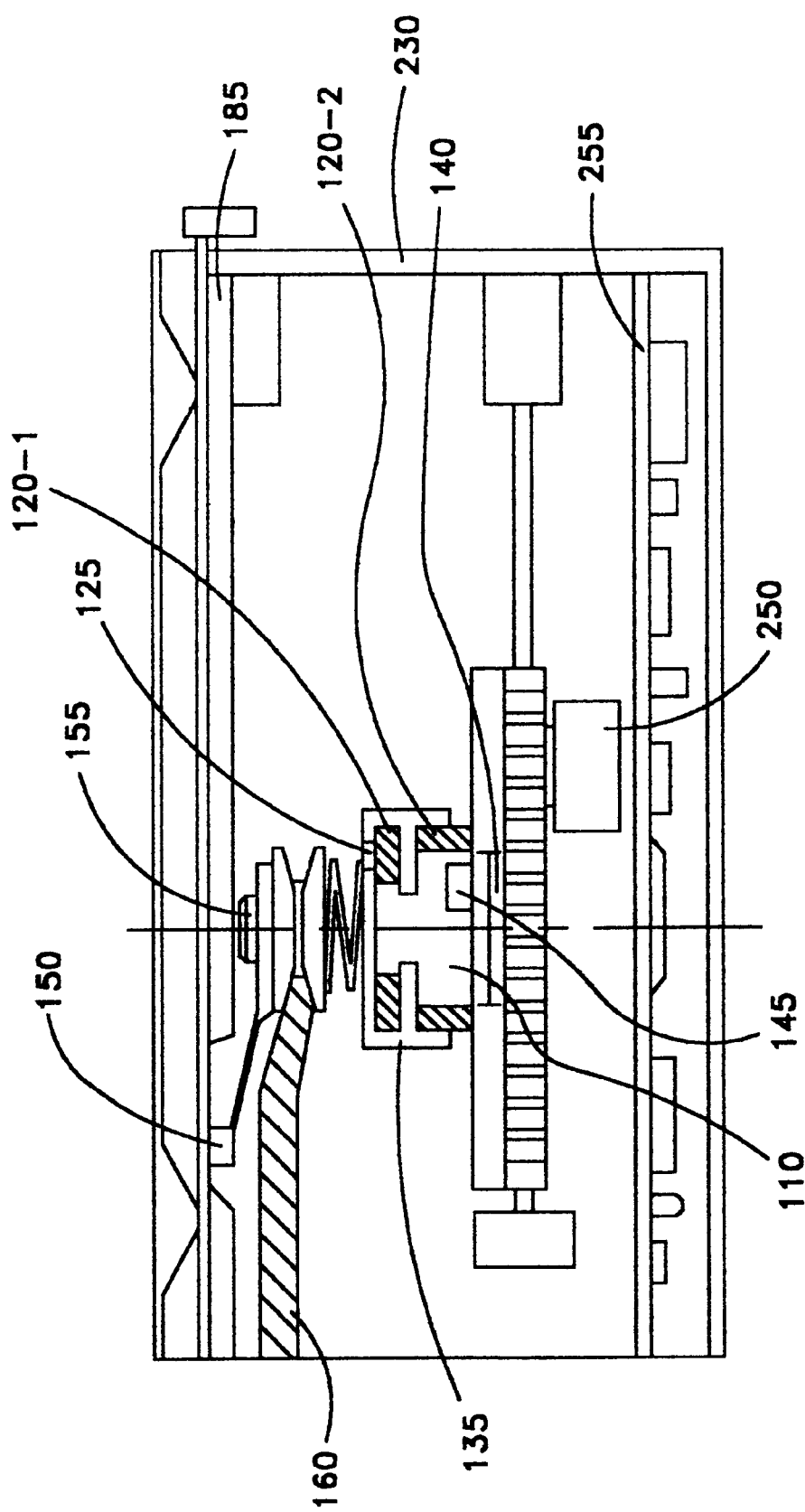
FIG. 1D shows a perspective view of the pickup head and the wires winding configuration serving as read/write data signal transformer.

The brushless motor 110 is mounted onto a motor-rack mount 200 with a rack 205 and a pinion 210. A step motor 220 is employed to control the linear movement of the motor 110 or the movement of the data card 180. The drive device 100 further includes a LCD display 230 to indicate the track position of the head 150 in reading or writing of data onto the data card 180. Mounted on the base plate 170 is a printed circuit board 240, which supports a track locator switch 245. The printed circuit board 240 further supports various kinds of circuits for performing the functions of control and data access. These circuits includes head tracking circuit 250, IC preamplifier 255, head loading/unloading circuits, disable/enable read-write function circuit, servo control integrated circuit (IC), motor control IC, data separator IC, ADI interface IC, USB interface IC, PCMCIA interface IC, USB connector, PCMCIA connector, and other circuits required for controlling and operating the data card drive system. FIGS. 1C and 1D are cross sectional views for showing the details of the rack 205, the pinion 210, and the head loading and unloading assembly 160 to lift the head when the drive device 100 is turned off. A head arm lifter 103 has a wire type hook 103A positioned above the pickup head arm 152. The sliding of the head arm lifter 103 with the wire type hook 103A along the motor shaft assembly can lift or lower the pickup head arm 152 and in turn lift or lower the pickup head 150. The pickup head arm 152 is rotating with the motor shaft and the pickup head 150. Regardless of where the pickup head 150 is when the rotational movement stops, the arm 152 can always engage the head lifter 103 slot sliding the head lifter 103 along the motor shaft.

The drive device 100 as described above is also provided with an option to perform the functions of a servo writer. A novel servo writer is disclosed in this invention which can be manufactured with simplified manufacturing processes. The servo writer includes a storage card loading assembly that is structured similarly to a card guide 185 of the device 100. The storage card can be inserted horizontally for direct contact with the pickup head 150. Or, depending on specific application, the data storage card can be inserted from a vertical slot opening and then flipped over for contact with the pickup head. In writing the servo data, the pickup head 150 is rotating along different data tracks. The pickup head is moved to different tracks during the operation of writing servo data by either moving the head/motor assembly mounted on the shaft or by keeping the head/motor assembly stationary while horizontally moving the data storage card. The magnetic transformer is employed in writing the servo data onto different data tracks where the cables are arranged without being twisted when the pickup head is making rotational movement.

Figure 1E:
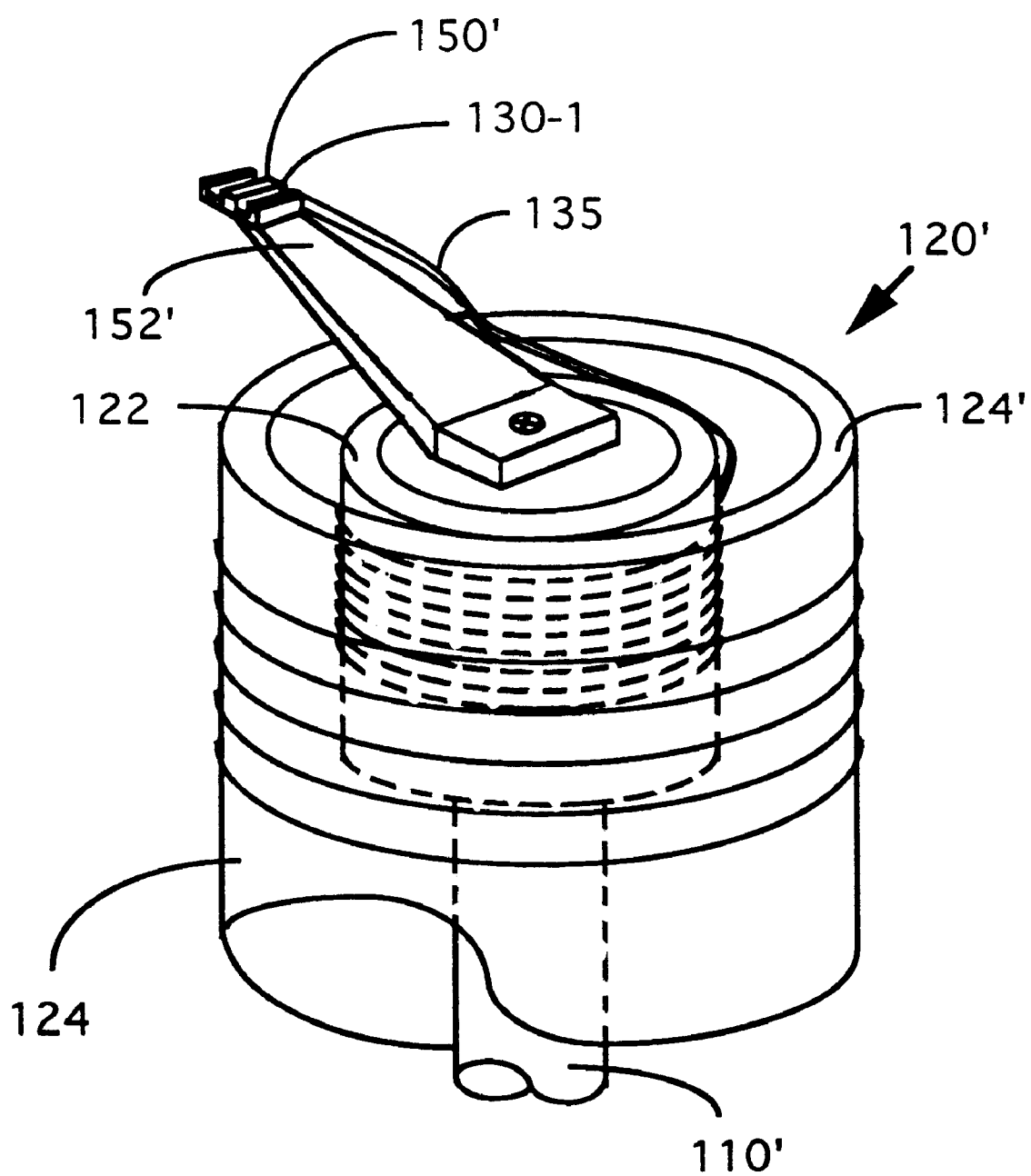
FIG. 1E shows a perspective view of the pickup head and the wires winding configuration serving as read/write data signal transformer.

FIG. 1E is a perspective view of an alternate configuration of a data signal transformer 120'. The data signal wires 130-1 connected to the pickup head 150' supported on the arm 152' for the pickup head 150' are first winding around an inner signal transforming cylinder 122', which rotates with the rotation shaft or the motor 110'. A stationary hollow pipe 124' is placed around the inner signal-transforming cylinder 122'. A set of signal transforming wires wrap around this stationary hollow pipe 124'. For read/write data, an electric signal representing a binary bit can be transferred from a pickup head 150' through the wires 135' to the wires wrapping around the inner signal-transforming cylinder 122'. The electric signals, typically an electric pulse, transferred to the wires around the inner cylinder 122' can be detected with variations of electromagnetic field by a set of wires wrapping around the stationary hollow pipe 124'. Similarly, the data signal for the pickup head 150' can also be provided to the wires wrapping around the stationary hollow pipe 124' as electric pulses and detected by the wires wrapping around the inner signal transforming cylinder 122' for transfer to the pickup head 150'. The wires around the inner and outer cylindrical pipes function as inductive coils serving the function of data signal transformation.

Figure 2A:
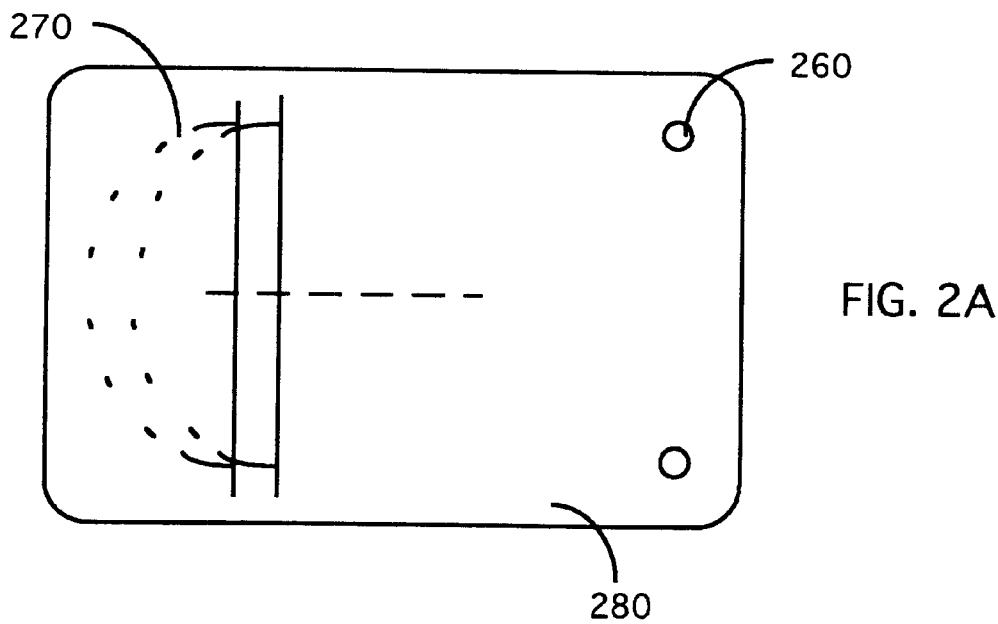
FIGS. 2A to 2C are respectively a top view, a cross sectional view and a bottom view of a data storage card with data tracks formed for storing bits with uniform density in each of these data tracks.
Figure 2B:
Figure 2C:
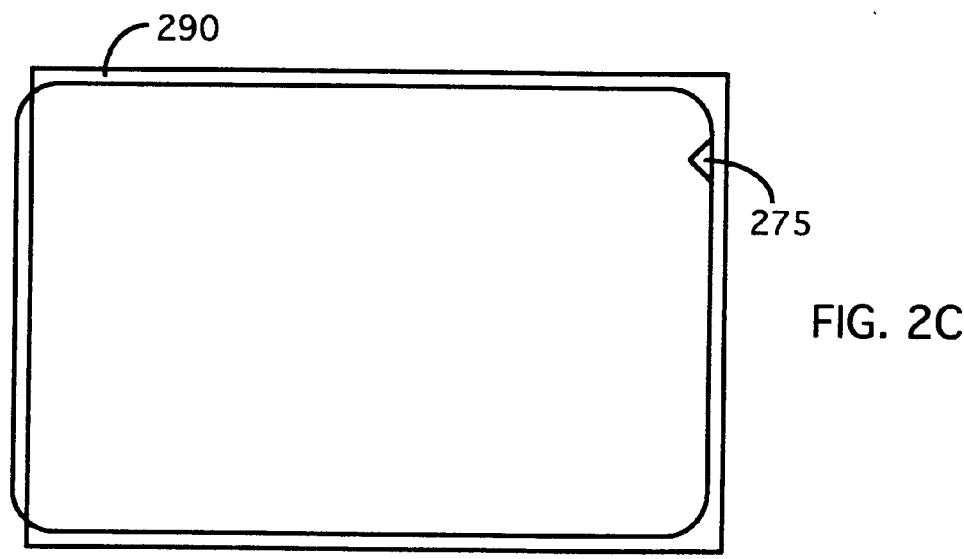

FIGS. 2A to 2C are respectively a top view, a cross sectional view, and a bottom view of a data card 180 of the present invention. The data card 180 is formed on a substrate plate 250. The substrate-plate 250 for magnetic or optical recording is composed of non-magnetizable materials with a flat surface, e.g., a plastic or glass substrate plate. For magnetic recording, a magnetizable material can also be employed to form the substrate plate 250. The substrate plate 250 is then coated with a thin layer of recording medium on one side or both sides. For magnetic recording, the coating are formed by magnetic particles coated on one-side or both sides of the substrate plate 250. The magnetic coating can be directly on the surface of the substrate plate 250 or on a Mylar type of material with adhesive layer for attaching to the substrate plate 250. For magnetic recording the recording medium layer can be formed by a process similar to that of a magnetic compact-disk (CD), CDR, LD, or digital video display (DVD) disks. The data card 180 can be formed with standardized sizes, e.g., PCMCIA standard sizes or standard credit card sizes, and has round or elongated holes 260 for fixing the card at pre-designated positions to initialize a data access operation. The holes 260 are fitted to the pins 190 to provide the self-centering and locking functions. The data storage card 280 can therefore be repeatedly placed at a pre-designated position with reliable accuracy. The data card 180 is provided with a plurality of data tracks 270 for storing data bit on each track. Each of these data tracks is formed as substantially an arc or arc-segments track. The data tracks 270 are substantially of the same length and are substantially parallel to each other. The data tracks 270 are formatted to include multiple sectors. One or several of these sectors can be flexibly employed to provide servo data for the purpose of identifying track locations to enhance sector seeking during a data-access operation. The servo-data are provided in sectors near both ends of the arc or arc-segments data tracks 270 as shown in FIG. 2A. For the purpose of more precisely positioning the data card 180 in a drive device, a notch 275 is formed near the inner end of the data card 180. With the notch 275, the data card 180 is more conveniently placed into the drive device fitted to the initial card position ready for operation relative to the position of the pickup head 150. The data card 180 is then covered by a protective coating 280 preventing damages from exposure to water, dust and other foreign particles introduced through the daily operational environment The data card 180 is then stored in a data card envelop 290 for storage and shipment. The data storage tracks of the data card may contain user application and system configuration data. The recorded data can be updated in the field. Application system can either encrypt or decrypt the recorded data. Application system can also change the configuration such as set and reset the write protection, the password and other features related to the data-access operations.

Figure 2D:
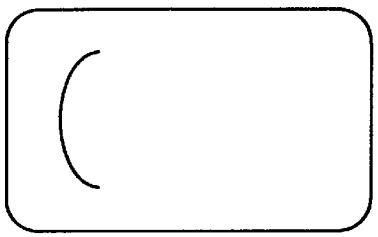
FIGS. 2D to 2Q show the top views of the data storage card of this invention where the data tracks can be arranged in arc-segments of different shapes, sizes, and facing different directions.
Figure 2E:
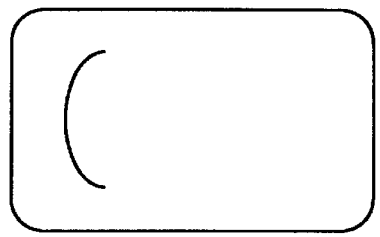
Figure 2F:
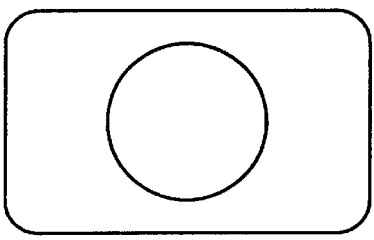
Figure 2G:
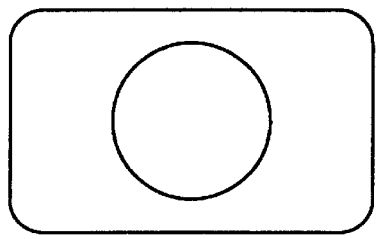
Figure 2H:
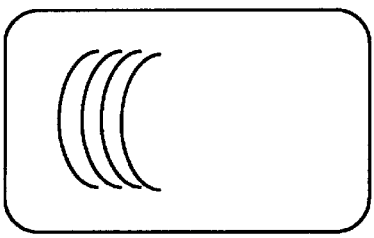
Figure 2I:
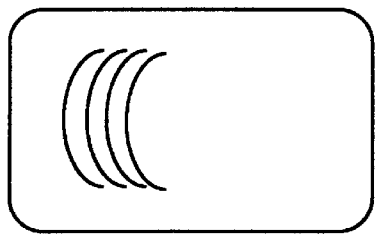
Figure 2J:
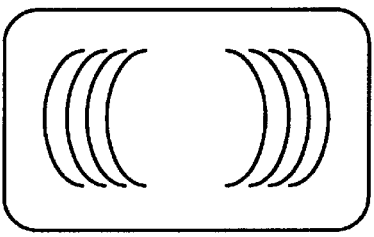
Figure 2K:
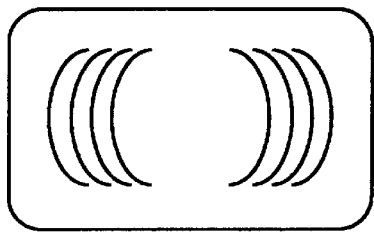
Figure 2L:
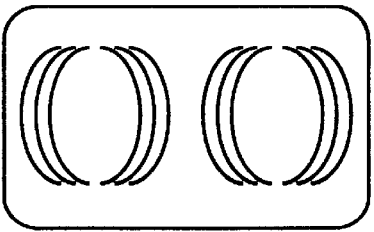
Figure 2M:
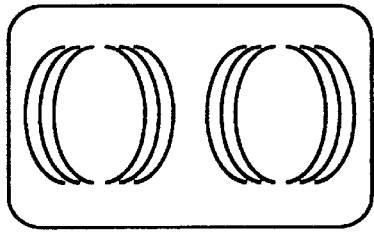
Figure 2N:
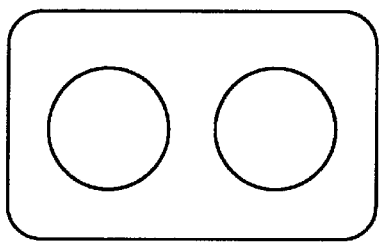
Figure 2O:
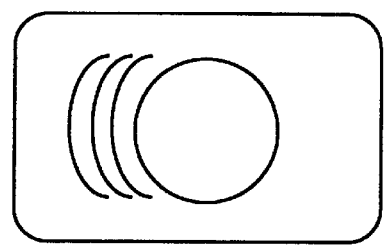
Figure 2P:
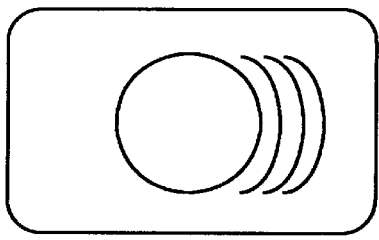
Figure 2Q:
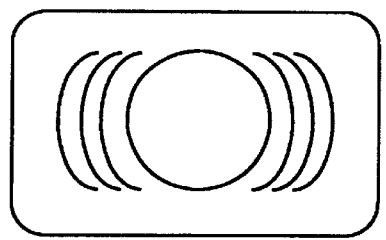

FIGS. 2D to 2E are top views of the data storage card 180 for showing different configuration of the data tracks 270. The data tracks 270-1 can be parallel arcs facing opposite directions on either side of the data card 180 as shown in FIG. 2D. Alternately, each of the data tracks 270-1 as parallel arc as that shown in FIG. 2D, can be partitioned into a plurality of arc-segment 270-2 as that shown in FIG. 2E. In a similar manner, the data tracks can be parallel arcs 270-3 formed over the entire data card area as that shown in FIG. 2F. Furthermore, each of the parallel arcs 270-3 of FIG. 2F can also be partitioned into a plurality of arc segments 270-4 as that shown in FIG. 2G.

According to FIGS. 1 to 2, this invention discloses a magnetic or optical data-storage card. The magnetic or optical data-storage card includes a magnetic or optical data-storage medium layer supported on the card. The data-storage medium layer includes a plurality of data storage tracks for storing data therein. Each of the tracks comprising at least an arc-segment wherein each of the data storage track being substantially parallel to a neighboring track In a preferred embodiment, each of the arc-segments are substantially of the same segment length. In a preferred embodiment, the data-storage tracks further storing servo control data. In a preferred embodiment, the data-storage tracks further storing the servo-control data at a substantially same relative position on the data-storage tracks. In another preferred embodiment, the data-storage tracks further storing the servo-control data near edges of the data-storage card on the data-storage tracks. In another preferred embodiment, each of the data-storage tracks is substantially a semicircular arc-segment. In another preferred embodiment, each of the data-storage tracks includes several arc segments. In another preferred embodiment, the magnetic or optical data-storage card further includes self-positioning guiding means for guiding the card to a loading position when inserted into a data card drive device. In another preferred embodiment, the magnetic or optical data storage card having a first side and a second side and the data-storage tracks are disposed on the first and second sides. In another preferred embodiment, the magnetic or optical data storage further includes a card jacket for storing the data storage card.

Figure 3A:
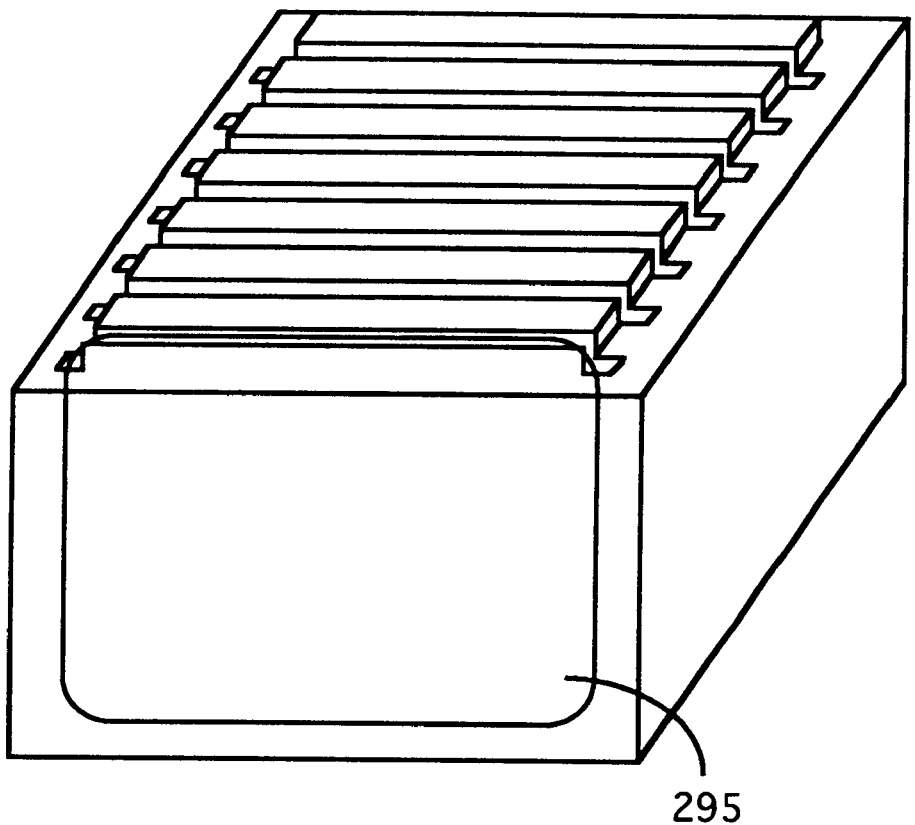
FIGS. 3A and 3B are a perspective view and a cross sectional view respectively of a data card storage box.
Figure 3B:
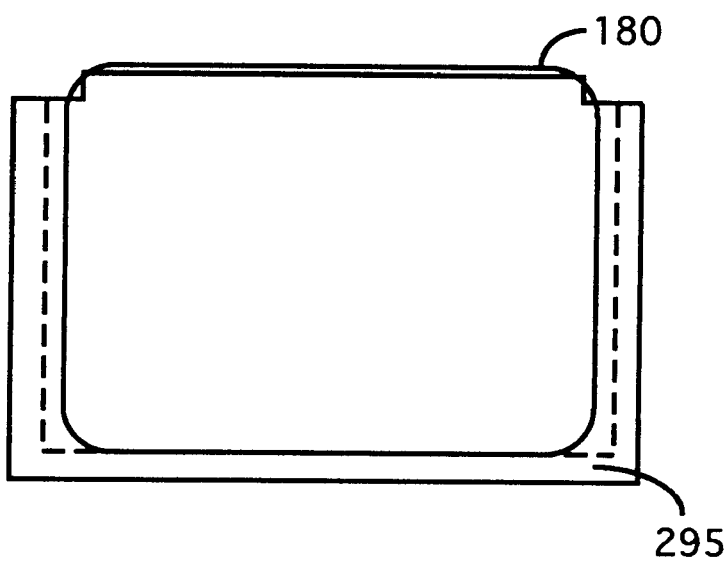

FIGS. 3A and 3B are a perspective view and a side view of a data card storage rack 295 for storing a plurality of data card 180 therein. The data card storage rack 295 as shown can be formed as partitioned storage box with each compartment ready to receive one data card 180. The data card storage rack 295 can function as a portable digital camera album or a backup data store for long term data storage.

Figure 4:
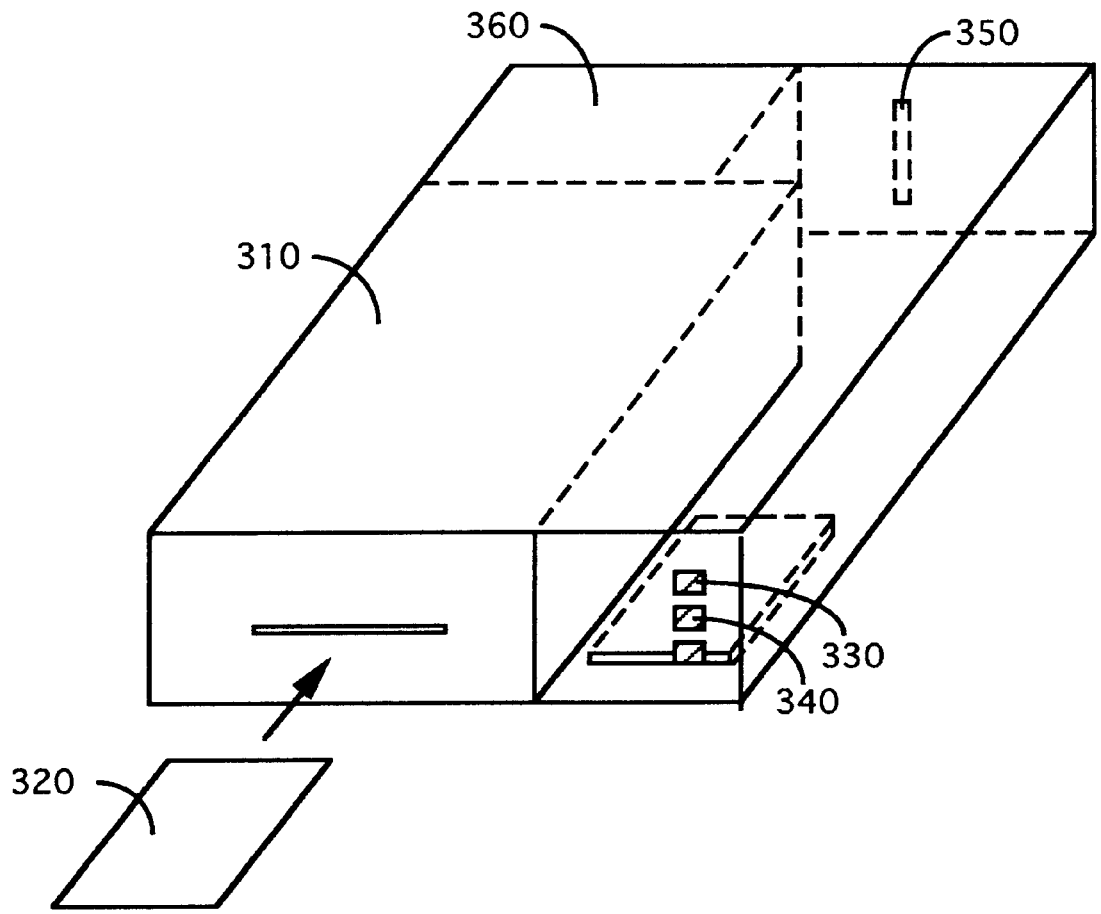
FIG. 4 is a functional block diagram of a subsystem of this invention which includes a data card drive device of FIGS. 1A to 1C for reading/writing data storage card of FIGS. 2A to 2C.

FIG. 4 shows a subsystem 300 of this invention that includes a data card drive device 310 identical with the drive device 100 described above according to FIGS. 1A to 1C. The disk drive device 310 performs the data access tasks on a data storage card 320 identical to the data card 180 described above according to FIGS. 2A to 2C. The subsystem 300 further includes a local memory 330, which can be a DRAM or SRAM memory device connected to the disk drive device 310. The data stored in data card 320 can be first down loaded to the memory device 330 through a data bus for data storage. The subsystem 300 further includes a function control panel 340 to allow a user to control the subsystem startup, shutdown, save, update, and duplication of the data stored in the card. The subsystem 300 is further provided with a connection terminal 350 for connection to a personal computer, a printer, a scanner or other peripheral devices for operation together with the drive device subsystem 300. A power supply 360 is employed and connected to the subsystem 300 to provide power necessary for operating the drive device 310, the memory 340 and the control panel 330.

Figure 5A:
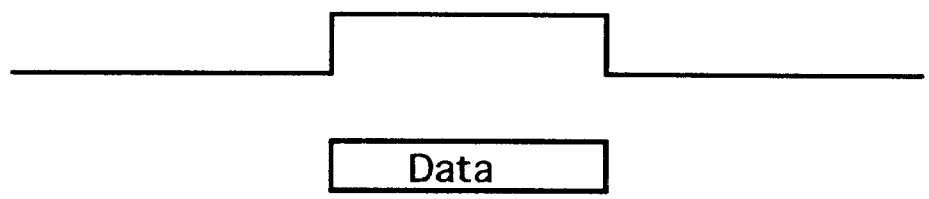
FIG. 5A is a timing diagram for showing the lengths of write current to write a new data bit that overwrites the old data bit to correctly write the new data bit onto a data track.
Figure 5B:
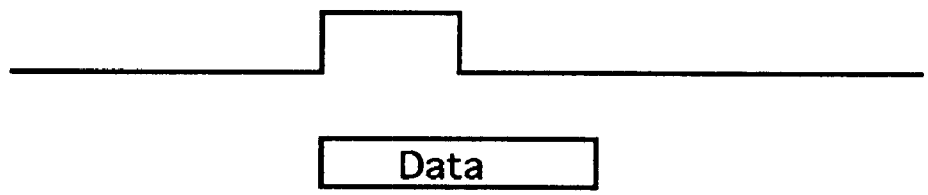
FIG. 5B is a timing diagram for showing the lengths of write currents to write a new data bit that does not completely overwrite the old data bit thus causing errors in recording the data onto the data tracks.
Figure 5C:
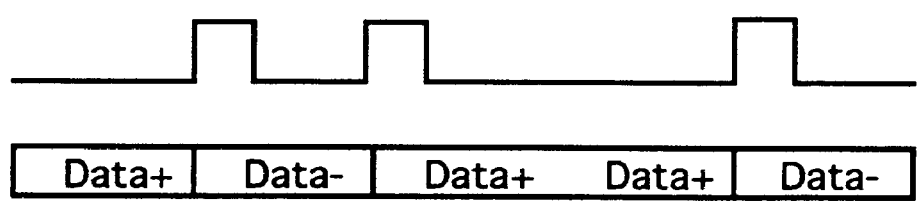
FIG. 5C is a timing diagram for showing the data reading process for detecting the data field transitions.

During a write operation, a preamplifier sends a pulse of constant current through the head winding circuit Referring to FIG. 5A for the writing operation. The length of the constant current pulses must be long enough to overwrite the old binary bits stored in the data-bit slots. FIG. 5B shows a defective data-writing operation where a writing current pulse does not have a sufficient pulse-length to overwrite the original data-bit. Defective data-bit writing likely will result in erroneous data recording and retrieval because the old data bit is not completely overwritten by a new updated data bit. FIG. 5C shows the reading pluses when a binary bit is detected. The responding pulses should be as sharp as possible to accurately read back the data stored in the storage medium. The improved pickup head as that shown in FIG. 6 of this invention is to assure the old data bits are completely overwritten by the new data-bits.

Figure 6A:
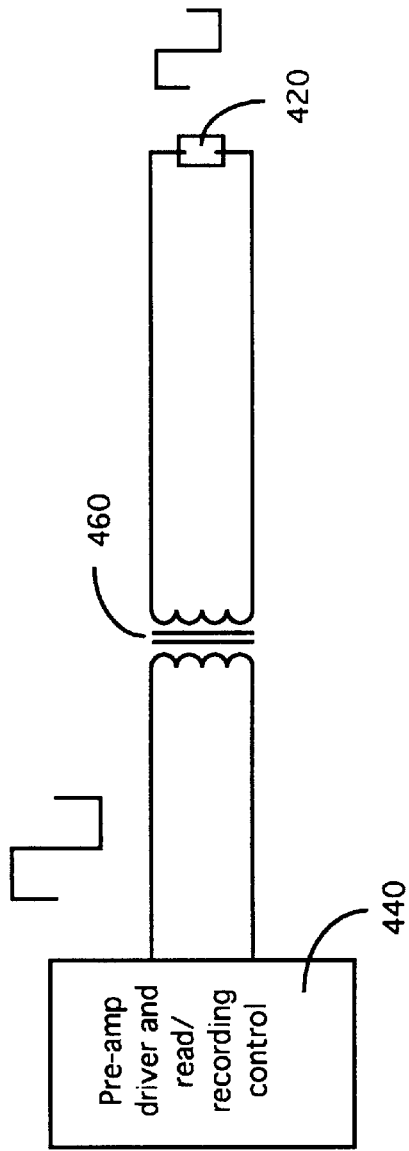
FIG. 6A is a circuit diagram of a transformer coupled recording apparatus of this invention.
Figure 6B:
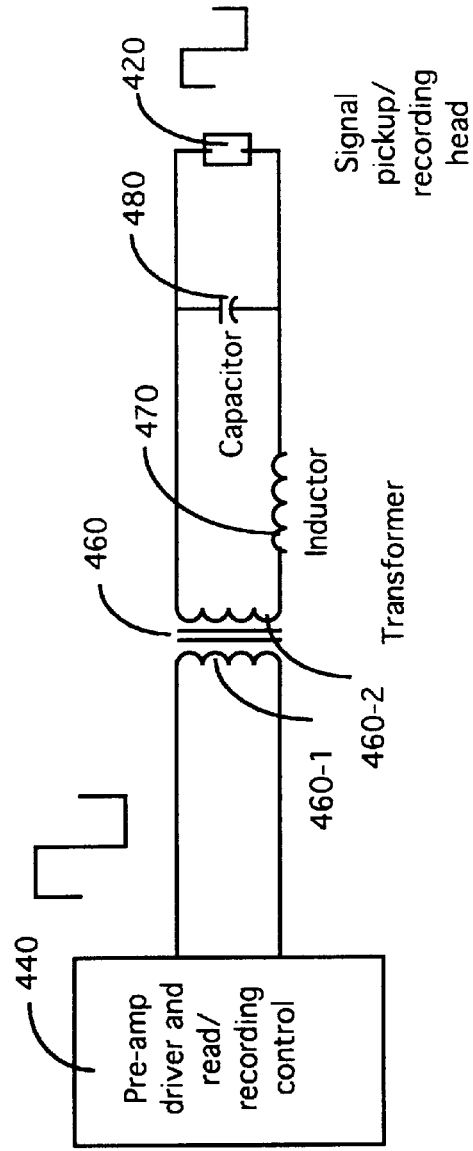
FIG. 6B is an improved circuit diagram of a transformer coupled recording apparatus of this invention.

FIG. 6A shows the circuit diagram of the transformer-coupled signal pickup head for reading and writing data to a data storage medium. A pickup head 420 is coupled to a preamplifier driver and read/recording controller 440 through a transformer 460. In the process of writing data to a storage medium, in order to avoid the problems of defective writing caused by a short pulse current as that shown in FIG. 5B, the response of the writing current transmitted to the pickup head must be carefully controlled. When a constant writing current is applied to the primary winding of the transformer 460, an inductive response current as the writing current transmitted to the pickup head 420 generated in the secondary winding will have a current amplitude that decays exponentially. In order to effectively overwrite the old data-bit in a writing cycle, the reduction of the writing current amplitude must be maintained at a level of no more than 10%. The amplitude of the inductive response current in the secondary winding must be maintained at this level for a period over the entire writing operation. This is achieved by making the threshold of the transformer 460 to about ten times higher than that of the preamplifier driver and read/recording controller 440. The inductance and capacitance of the transformer 460 at the secondary winding is adjusted to achieve this design requirement. As shown in FIG. 6B, the inductance and capacitance of the transformer 460 at the secondary winding is increased to about ten times higher than the combined inductance and capacitance of the preamplifier driver and read/recording controller 440. With such design considerations, the write current will have a waveform that has less than 10% sag, taking into account the effect of the total resistance and write current pulse width. Referring to FIG. 5B, the number of turns of the primary and secondary winding of the transformer 460 are kept at one to provide a turn ratio of one. Additional inductor 470 and capacitor 480 are added to the secondary winding of the transformer 460. The response current at the secondary winding when applied to the pickup head 420 for writing data onto the storage medium will have greater decay constant and kept at substantially constant level during the writing cycles with increased inductance L and capacitance C. This configuration ensures proper recording of the data on the storage medium during a writing cycle with new data bits completely overwrite the old data bits.

According to FIGS. 6A and 6B, this invention discloses a data storage drive system. The system includes a pickup head for performing data access functions connected to a secondary winding 460-2 of a transformer 460. The transformer 460 further includes a primary winding 460-1 connected to a driver controller 440 provided with a preamplifier for generating a data writing pulse. The secondary winding 460-2 further having a pulse decay-constant adjustment capacitor 480 and a pulse decay-constant adjustment inductor 470 for adjusting a pulse decay constant for generating less than ten-percent sag for the data writing pulse whereby the writing pulse can overwrite an entire bit-length onto a data track In a preferred embodiment, the pickup head 420 and the secondary winding 460-2 are configured as a removable and replaceable module. In a preferred embodiment, the pickup head 420 is provided with signal reading and writing head for a magnetic or optical flat data-storage medium. In another preferred embodiment, the pickup head 420 is provided with signal reading and writing head for an optical flat data-storage medium. In another preferred embodiment, the drive system is further provided with an optical to electrical signal converter for converting optical signals retrieved from the optical flat data-storage medium to electrical signals. In summary, a data storage drive system is disclosed in this invention. The drive system includes a transformer 460 that comprises a primary winding 460-1 and a secondary winding 460-2. The drive system further includes a pickup head 420 connected to the secondary winding 460-2. The driver system further a driver controller 440 for generating a data writing pulse connected to the primary winding 460-1. The secondary winding 460-2 further has a greater pulse decay constant than the primary winding 460-1 for reducing a sag of the data writing current pulse generated in the secondary winding.

This invention further discloses a method for configuring a data storage drive system. The method includes the steps of: a) connecting a pickup head for performing data access functions to a secondary winding of a transformer; b) connecting a primary winding of the transformer to a driver controller provided with a pre-amplifier for generating a data writing pulse; and c) adding a pulse decay-constant adjustment capacitor and a pulse decay-constant adjustment inductor to the secondary winding for adjusting a pulse decay constant for generating less than ten-percent sag for the data writing pulse whereby the writing pulse can overwrite an entire bit-length onto a data track. In a preferred embodiment, the method further includes a step of d) configuring the pickup head and the secondary winding as a removable and replaceable module. In a preferred embodiment, the method further includes a step of e) providing a pickup head with a signal reading and writing head for a magnetic flat data-storage medium. In a preferred embodiment, the method further includes a step of f) providing a pickup head with a signal reading and writing head for an optical flat data-storage medium. In a preferred embodiment, the method further includes a step of g) providing an optical to electrical signal converter for converting optical signals retrieved from the optical flat data-storage medium to electrical signals. In summary, this invention further discloses a method for configuring a data storage drive system. The method includes the steps of a) providing a transformer comprising a primary winding and a secondary winding; b) connecting a pickup head to the secondary winding; c) connecting a driver controller for generating a data writing pulse to the primary winding; and d) providing a greater pulse decay constant to the secondary winding than the primary winding for reducing a sag of the data writing pulse generated in the secondary winding.

Therefore, the present invention discloses a data storage-card drive system with a pickup head moving above a data-storage card in rotational movement. The data read-write functions are enabled only for an arc segment, e.g., half-circle, or several arc segments of the rotational movement. The data tracks are arranged as plurality of parallel arcs, e.g., half-circles, or arc-segments with uniform data bit storage density. The pickup head is further configured with transformer-coupled removable head that can be conveniently replaced such that the aforementioned difficulties and limitations encountered in the prior art can be resolved. Specifically, an improved transformer coupled pickup head configured as a removal module is used in this invention. The removable module can be conveniently removed and replaced. The pickup head is connected to a secondary winding of the transformer with the primary winding connected to a driver for generating write current pulses. The secondary side of the transformer has a greater pulse decay constant to assure that a write current has a sufficient pulse width to overwrite the entire length of the data bits on a data track. The pickup head is formed as either a magnetic or optical pickup head. For an optical pickup head, the drive system is further provided with an optical to electrical converter to convert optical signals to corresponding electrical signals for transfer through the transformer to a data signal processor.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A data storage drive system comprising:
a pickup head for performing data access functions connected to a secondary winding of a transformer;
said transformer further includes a primary winding connected to a driver controller provided with a pre-amplifier for generating a data writing pulse; and
said secondary winding further having a combined inductance-capacitance (LCs) greater than a combined inductance-capacitance (LCp) of said primary winding and said driver controller with a ratio R=LCs/LCp where R is a positive constant greater than one for generating said data writing pulse for adjusting a pulse decay constant in said secondary winding for generating less than ten-percent sag for said data writing pulse whereby said writing pulse can overwrite an entire bit-length onto a data track.

2. The data storage drive system claim 1 wherein:
said pickup head and said secondary winding with about ten-times combined inductance-capacitance (LCs) of said combined inductance-capacitance LCp of said primary winding and said driver controller are configured as a removable and replaceable module.

3. The data storage drive system claim 1 wherein:
said pickup head is provided with signal reading and writing head for a magnetic flat data-storage medium.

4. The data storage drive system claim 1 wherein:
said pickup head is provided with signal reading and writing head for an optical flat data-storage medium.

5. The data storage drive system claim 4 wherein:
said pickup head is further provided with an optical to electrical signal converter for converting optical signals retrieved from said optical flat data-storage medium to electrical signals.

6. A data storage drive system comprising:
a transformer comprising a primary winding and a secondary winding;
a pickup head connected to said secondary winding;
a driver controller for generating data writing pulse connected to said primary winding; and
said secondary winding further having a pulse decay constant at least two times greater than a pulse decay constant of said primary winding and said driver controller for reducing a sag of said data writing pulse generated in said secondary winding in response to said data writing pulse generated by said driver controller.

7. The data storage drive system claim 6 wherein:
said pickup head and said secondary winding are configured as a removable and replaceable module.

8. The data storage drive system claim 6 wherein:
said pickup head is provided with signal reading and writing head for a magnetic flat data-storage medium.

9. The data storage drive system claim 6 wherein:
said pickup head is provided with signal reading and writing head for an optical flat data-storage medium.

10. The data storage drive system claim 9 wherein:
said pickup head is further provided with an optical to electrical signal converter for converting optical signals retrieved from said optical flat data-storage medium to electrical signals.

11. A method for manufacturing a data storage drive system comprising:
a) connecting a pickup head for performing data access functions to a secondary winding of a transformer;
b) connecting a primary winding of said transformer to a driver controller provided with a pre-amplifier for generating a data writing pulse; and
c) adjusting a combined inductance-capacitance (LCs) of said secondary winding greater than a combined inductance capacitance LCp of said primary winding and said driver controller with a ratio R=LCs/LCp where R is a positive constant greater than one for generating said data writing pulse for adjusting a pulse decay constant in secondary winding for generating less than ten-percent sag for said data writing pulse whereby said writing pulse can overwrite an entire bit-length onto a data track.

12. The method of claim 11 further includes a step of:
d) configuring said pickup head and said secondary winding with about ten-times combined inductance-capacitance (LCs) of said combined inductance-capacitance LCp of said primary winding and said driver controller as a removable and replaceable module.

13. The method of claim 11 further includes a step of:
e) providing a pickup head with a signal reading and writing head for a magnetic flat data-storage medium.

14. The method of claim 11 further includes a step of:
f) providing a pickup head with a signal reading and writing head for an optical flat data-storage medium.

15. The method of claim 14 further includes a step of:
g) providing an optical to electrical signal converter for converting optical signals retrieved from said optical flat data-storage medium to electrical signals.

16. A method for configuring a data storage drive system comprising:
a) providing a transformer comprising a primary winding and a secondary winding;
b) connecting a pickup head to said secondary winding;
c) connecting a driver controller for generating a data writing pulse to said primary winding; and
d) providing a pulse decay constant to said secondary winding at least two times greater than a pulse decay constant of said primary winding and said driver controller for reducing a sag of said data writing pulse generated in said secondary winding in response to said data writing pulse generated by said driver controller.

17. The method of claim 16 further includes a step of:
e) configuring said pickup head and said secondary winding as a removable and replaceable module.

18. The method of claim 16 further includes a step of:
f) providing a pickup head with a signal reading and writing head for a magnetic flat data-storage medium.

19. The method of claim 18 further includes a step of:
g) providing a pickup head with a signal reading and writing head for an optical flat data-storage medium.

20. The method of claim 19 further includes a step of:
h) providing an optical to electrical signal converter for converting optical signals retrieved from said optical flat data-storage medium to electrical signals.

* * * * *